(No Model.) 2 Sheets—Sheet 1.

W. R., J. T. & G. B. RODGERS.
PACKING ATTACHMENT FOR COTTON AND OTHER PRESSES.

No. 357,232. Patented Feb. 8, 1887.

(No Model.) 2 Sheets—Sheet 2.

W. R., J. T. & G. B. RODGERS
PACKING ATTACHMENT FOR COTTON AND OTHER PRESSES.

No. 357,232. Patented Feb. 8, 1887.

Witnesses
Percy C. Bowen
J. W. Garner

Inventors,
William R. Rodgers,
James T. Rodgers,
George B. Rodgers,
By their Attorneys
C. A. Snow & Co.

N. PETERS, Photo-Lithographer, Washington, D. C.

UNITED STATES PATENT OFFICE.

WILLIAM R. RODGERS, JAMES T. RODGERS, AND GEORGE B. RODGERS, OF MEMPHIS, TENNESSEE.

PACKING ATTACHMENT FOR COTTON AND OTHER PRESSES.

SPECIFICATION forming part of Letters Patent No. 357,232, dated February 8, 1887.

Application filed April 30, 1886. Serial No. 200,706. (No model.)

*To all whom it may concern:*

Be it known that we, WILLIAM R. RODGERS, JAMES T. RODGERS, and GEORGE B. RODGERS, citizens of the United States, residing at Memphis, in the county of Shelby and State of Tennessee, have invented a new and useful Improvement in Packing Attachments for Cotton and other Presses, of which the following is a specification.

Our invention relates to an improvement in packing attachments for cotton and other presses; and it consists in the peculiar construction and combination of devices, that will be more fully set forth hereinafter, and particularly pointed out in the claims.

Figure 1:
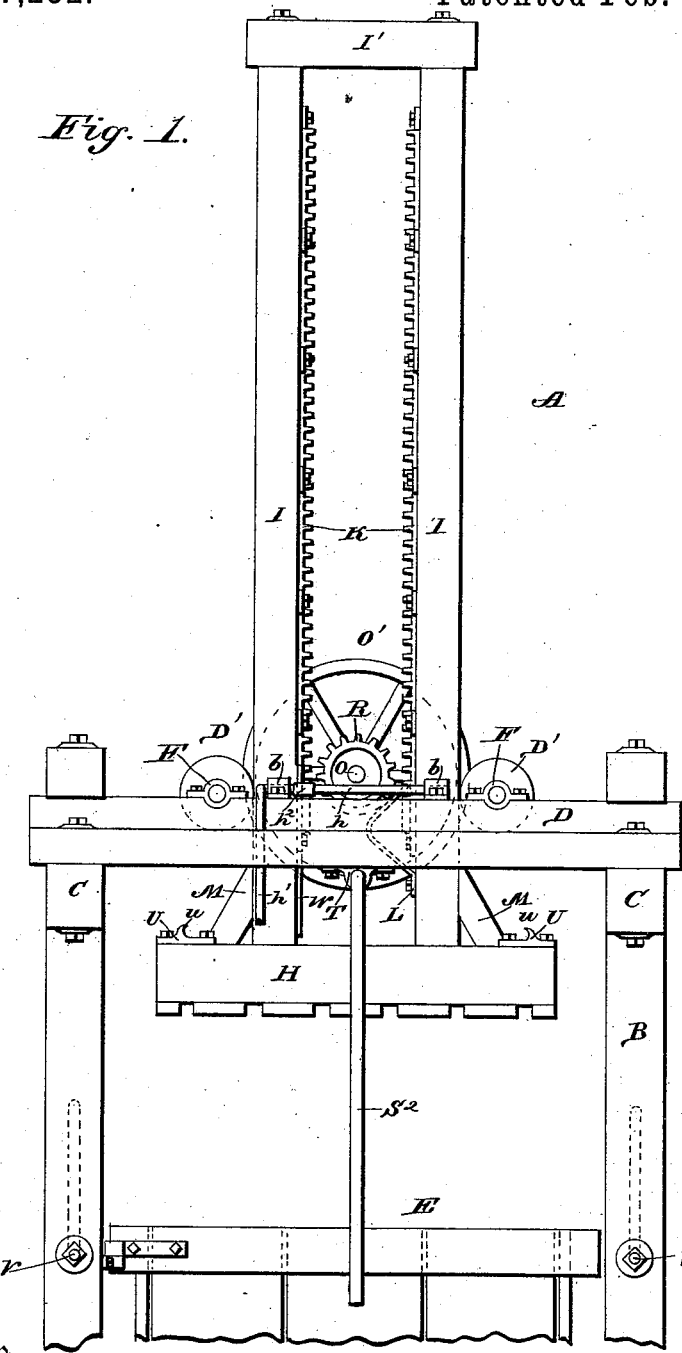
Figure 5:
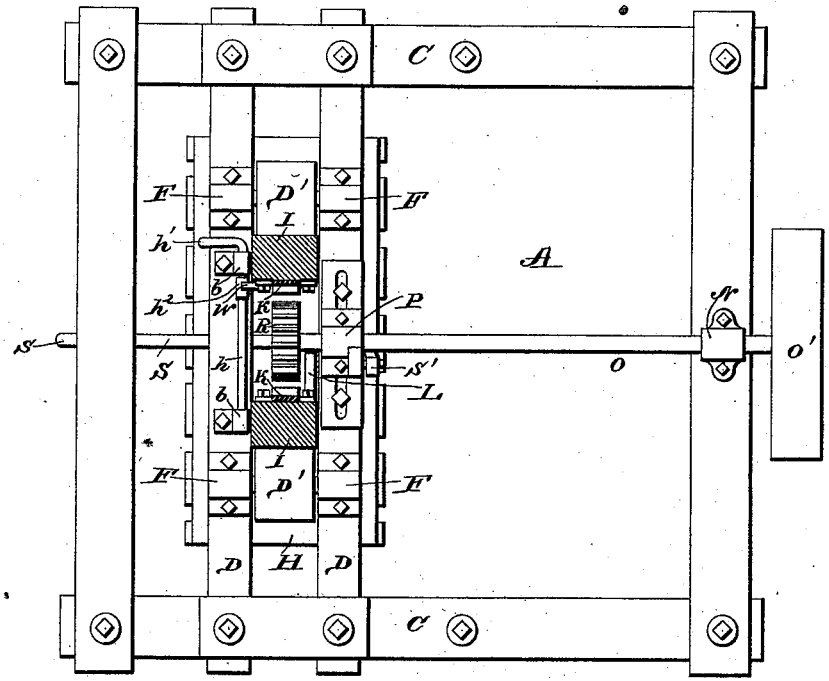
Figure 2:
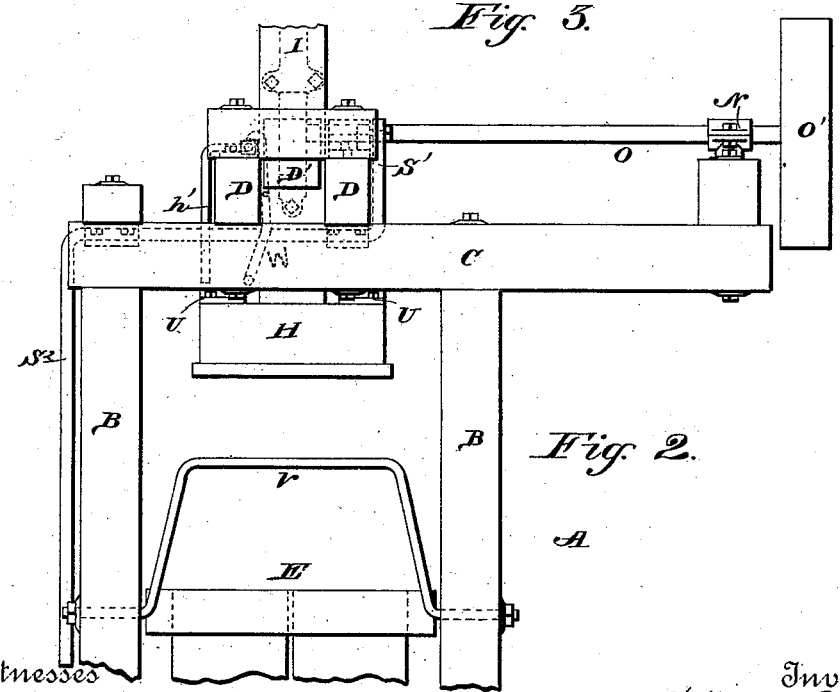

In the drawings, Figure 1 is a side elevation. Fig. 2 is an end elevation. Fig. 3 is a top plan view, partly in section.

A represents the upper portion of a cotton-press, which is composed of the vertical standards B, the horizontal cross-bars C, and the horizontal longitudinal bars D, all of which are of the usual construction.

E represents the box of the press.

The object of our invention is to provide an apparatus for packing the cotton in the press-box before subjecting it to the action of the follower and forming the bale.

On the bars D, at a suitable distance from each side of the centers of the said bars, are secured bearings F, in which are journaled rollers D'.

H represents the packing-head, which is provided on its upper side with vertical bars I, having their upper ends connected by a transverse bar, I'. On the inner opposing sides of the vertical bars I are secured rack-plates K. Near the lower end of one of the said bars is secured an inwardly-projecting bracket L, the sides of which form two sides of a triangle. The bars I are braced in position on the packing-head by means of angle-braces M. The vertical bars I bear against the inner sides of the rollers D, and the bars are thus free to be moved either up or down, so as to raise or lower the packing-head. On one side of the top of the press-frame, at the center thereof, is swiveled a bearing, N, in which is journaled the outer end of a shaft, O. A sliding bearing, P, which moves in suitable guideways on one of the longitudinal beams of the press-frame, forms a journal for the inner portion of the shaft O, and to the inner end of the said shaft is fixed a gear-pinion, R.

S represents a rock-shaft, which is journaled in suitable bearings, T, that are secured to the top of the press-frame, and the said rock-shaft is provided at one end with an arm, S', that engages with the inner end of the shaft O, and the outer end of the rock-shaft S is provided with a depending lever-arm, $S^2$. By moving the arm $S^2$ in one direction the gear-pinion will be caused to engage with one of the rack-plates, and by moving the said arm in the contrary direction the gear-pinion will engage with the opposite rack-plate. When the arm is released, its gravity causes the pinion R to be moved out of contact with both of the rack-plates. To the outer end of the shaft O is secured a band-pulley, O', which may be driven by any suitable motor.

On the upper side of the packer-head H, at the ends thereof, are secured plates U, having vertical projecting hooks or detents $u$, and in the ends of the press-frame, at a suitable distance from the upper side thereof, are pivoted bails V.

W represents a gravity-latch, which is pivoted to the inner side of one of the bars I.

On the upper side of one of the beams D are secured bearing-boxes $b$, in which is journaled a rock-shaft, $h$, having at one end a depending arm or lever, $h'$, which is bent at right angles, and thereby enabled to clear the beam D. The rock-shaft is also provided with an enlarged square bearing portion, $h^2$. When the packer is raised to the top of the press-frame, the latch W engages the square portion of the rock-shaft, and thereby locks the packer in the elevated position.

The operation of my invention is as follows: While the shaft O is in motion the arm $S^2$ is moved, so as to cause the pinion R to engage with one of the rack-plates, and the gravity-latch, having been previously released by moving the arm $h'$ so as to tilt the square portion of the rock-shaft, the pinion, by rotating in gear with the rack-plate, forces the packer-head downward in the press-box and packs the cotton which has been thrown into the latter firmly therein. When the packer reaches the lower limit of its movement, the arm S² is shifted to cause the pinion R to engage with the opposite rack-plate and raise the packer from the press-box. When the packer nears the upper limit of its movement, the bracket or arm L comes in contact with the inner end of the shaft O, and thus automatically moves the latter, so as to cause the pinion R to disengage the rack-plate. When the press-box has been packed sufficiently full of cotton, the packing-head is lowered therein and the bails V are caused to engage with the detents or hooks u on the packing-head, and thereby lock the latter in the upper sides of the press-box. The follower of the press is then forced upwardly in the press-box and the cotton is compressed into a bale between the sides of the box and the follower and the packer, and secured by means of fastening devices in the usual way.

A cotton-packing apparatus thus constructed is cheap and simple, is very rapid, and is easily operated.

Having thus described our invention, we claim—

1. The combination, with a press, of the packing-head having the vertical bars provided with the rack-teeth, the laterally-movable rotating shaft carrying the pinion for meshing with either of the series of rack-teeth, and the tappet arm or bracket L, for engaging with the said shaft when the packing-head is raised to cause the pinions to disengage the rack-teeth by moving its shaft laterally, for the purpose set forth, substantially as described.

2. The combination, with a press, of the packing-head having the vertical bars provided with the rack-teeth on their opposing sides, the laterally-movable rotating shaft O, carrying the pinion, and the lever for moving the said shaft laterally to cause the pinion to engage with either of the series of rack-teeth and thereby raise or lower the packing-head, substantially as described.

3. The combination, with the press, of the movable packing-head, and the latch W, pivoted to the packing-head for engaging with the press-frame and locking the packing-head thereto in an elevated position, substantially as described.

4. The combination, with a press having the bails or loops V, of the packing-head having the hooks or projections u, with which the said loops engage when the packing-head is lowered in the press-box, whereby the said packing-head may be locked in the press-box, for the purpose set forth, substantially as described.

In testimony that we claim the foregoing as our own we have hereto affixed our signatures in presence of two witnesses.

WILLIAM R. RODGERS.
JAMES T. RODGERS.
GEORGE B. RODGERS.

Witnesses:
PATK. McDERMOTT,
HENRY H. MILBURN.